United States Patent Office 3,669,619
Patented June 13, 1972

3,669,619
PRODUCTION OF DIAMMONIUM HYDROGEN HEXAFLUOROALUMINATE AND ALUMINUM FLUORIDE
Norman W. Meyers, Etobicoke, Ontario, Canada, assignor to Electric Reduction Company of Canada, Ltd., Islington, Ontario, Canada
No Drawing. Filed Jan. 29, 1970, Ser. No. 6,967
Claims priority, application Great Britain, Jan. 30, 1969, 5,236/69
Int. Cl. C01f 7/02
U.S. Cl. 23—52
11 Claims

ABSTRACT OF THE DISCLOSURE

Diammonium hydrogen hexafluoroaluminate is formed by reacting an aluminum-containing material with fluosilicic acid at a pH sufficient to inhibit precipitation of aluminum fluoride trihydrate. The F:Al atomic ratio of the resulting solution is increased to at least 5:1 and the solution is reacted with ammonia at a pH below about 5.

This invention relates to the production of fluorides and in particular provides a novel ammonium fluoaluminate which is of use in the manufacture of aluminum fluoride.

Aluminum fluoride is extensively used in the electrolytic production of aluminum metal. The electrolytic production of aluminum involves electrolysis of alumina dissolved in cryolite as electrolyte. The aluminum fluoride has the effect of both decreasing the melting point of the electrolyte and increasing the conductivity of the electrolyte. Aluminum fluoride also is used as a flux in ceramic glazes and enamels.

Fluosilicic acid is available as a by-product of the so-called "wet" process of producing phosphoric acid by reacting sulphuric acid with phosphate rock. Since phosphate rock commonly contains fluorides and silicates, fluosilicic acid commonly containing substantial quantities of $P_2O_5$, is obtained by side reactions.

It is known to recover the fluorine values of fluosilicic acid by reacting fluosilicic acid with alumina-containing materials to produce aluminum fluoride trihydrate. The anhydrous product then may be prepared by calcining at about 500–600° C. This aluminum fluoride, however, is contaminated with phosphorus which is objectionable in aluminum fluoride.

The present invention provides a process whereby a novel ammonium fluoaluminate is obtained. Such material may be converted to aluminum fluoride having a reduced phosphorus content.

The calcining of the aluminum fluoride trihydrate in the prior art operation to give the anhydrous material at about 600° C. gives rise to breakdown of some of the aluminum fluoride to alumina, and hydrogen fluoride, thereby reducing the value of the final product.

The present invention provides a process which in a preferred embodiment reduces the loss of aluminum fluoride values from the final product by decomposition.

The process of the present invention comprises reacting in aqueous solution an alumina-containing material, such as bauxite or purified alumina, with fluosilicic acid in the presence of ammonia at a sufficiently acid pH to precipitate a novel ammonium fluoaluminate. The novel ammonium fluoaluminate is substantially free of phosphorus.

The novel product is an acid ammonium salt analogous to cryolite. The analytical composition indicates the structure to be $(NH_4)_2HAlF_6H_2O$.

The expression diammonium hydrogen hexafluoroaluminate as used herein denotes any such composition crystallized at a pH less than 5 wherein the mole ratio $NH_4$:Al is greater than 1 and less than 3 and the ratio of F:Al is greater than 5, and includes both anhydrous and hydrated salts. In general the formula may be expressed as $(NH_4)_aH_bAlF_c(OH)_d.(H_2O)_e$ where $a$ is preferably between 1 and 3 and most preferably between 1.5 and 2.6, $b$ is preferably between 0.3 and 1.2, $c$ is preferably between 5.2 and 6 and $d$ is preferably between 0 and 0.8; $(c+d)$ is preferably substantially 6; $e$ is usually from 0 to 1, but may be higher.

Initial reaction occurs between the aluminum containing material, generally alumina, and fluosilicic acid. The atomic ratio of F:Al is generally about 3 to 1. Silica precipitates from this solution, in accordance with the reaction:

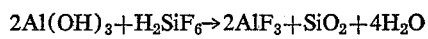

$$2Al(OH)_3 + H_2SiF_6 \rightarrow 2AlF_3 + SiO_2 + 4H_2O$$

It is necessary to prevent aluminum fluoride trihydrate from precipitating from the aluminum fluoride solution. It has been found that if the pH of the solution is allowed to rise above about 3, then aluminum fluoridetrihydrate is precipitated.

By the reaction of the alumina with the fluosilicic acid at a pH sufficiently acid to inhibit precipitation of aluminum fluoride trihydrate, it is possible to eliminate much of the silica content. However, substantially of the phosphorus content of the input fluosilicic acid remains in the aluminum fluoride solution.

The reaction between the alumina and fluosilicic acid generally takes place at a temperature of about 70 to 100° C., preferably about 90 to 95° C. and the reaction generally is complete in about 30 minutes.

The aluminum fluoride solution is treated to raise the F:Al atomic ratio generally above about 5:1, preferably to about 6:1. This may be achieved by bubbling gaseous hydrogen fluoride or fluorine through the solution. Upon treatment with ammonia at a pH below about 5, the novel product of the invention is recovered.

The novel product of the invention also may be formed from the aluminum fluoride solution by the addition of ammonium fluoride and, if necessary, further ammonia, maintaining the pH below about 5.

The product ammonium fluoaluminate of the approximate composition $(NH)_2H.AlF.H_2O$ is substantially free of phosphorus contamination.

If the pH of the reaction solution is allowed to rise above about 5, then the soluble phosphorus present in the solution coprecipitates with the ammonium fluoaluminate. In order, therefore, to obtain a substantially phosphorus-free product, it is necessary to maintain the pH of the solution below about 5. Preferably the pH is maintained below about 4.

Phosphorus present in the precipitate generally is soluble and is present in occluded liquid. After filtration to recover the ammonium fluoaluminate, the filter cake may be washed to remove substantial quantities of the soluble phosphorus.

The novel substantially phosphorus-free diammonium hydrogen hexafluoroaluminate may be calcined to readily form anhydrous aluminum fluoride. Since most of the silica content of the ammonium fluoaluminate is volatilized in the calcining operation, the anhydrous aluminum fluoride recovered is substantially silica- and phosphorus-free.

The $NH_3$ and HF driven off in the calcining operation may be recovered and utilized in the formation of the ammonium fluoaluminate from the aqueous aluminum fluoride solution.

The calcining operation may be carried out in two steps. Initial dehydration may occur at a temperature of about 100 to about 150° C., followed by heating at a temperature of from about 350° to about 600° C., preferably about 400° C.

The invention is illustrated by the following example:

EXAMPLE 39 gms. of Bayer alumina containing 37% Al was added slowly to a well-stirred fluosilicic acid solution containing 19.7% $H_2SiF_6$ at 90°–95° C. and about 0.2% $P_2O_5$. After 30 minutes reaction time the slurry was rapidly filtered and washed with water acidified to a pH of 3 with HCl. The silica cake weighed 18.9 gms. and contained 1.27% Al, i.e. 1.67% of the aluminum fed to the system. The combined filtrate and washings weighed 345.9 gms. and contained 4.09% Al.

A sample of this metastable solution of aluminum fluoride was treated with ammonium bifluoride crystals to bring the F:Al mole rate up to 6:1. Aqueous ammonia was then added to a pH of 1.5.

A further sample was similarly treated with ammonium bifluoride to provide an F:Al ratio of 6:1. Aqueous ammonia was then added to a pH of 3.0.

In both cases, a precipitate of ammonium acid cryolite formed immediately at room temperature. The precipitate was filtered and washed. Analysis of the products was carried out to determine the quantity of phosphorus. The filtrates were also analyzed to determine the aluminum, fluorine and ammonia contents. The following Table I summarizes the results:

TABLE I

| pH | 1.5 | 3.0 |
|---|---|---|
| Phosphorus in product (p.p.m.) | 1.0 | 5.0 |
| Aluminum in filtrate (percent) | 0.38 | 0.25 |
| Fluorine in filtrate (percent) | 3.45 | 1.17 |
| Ammonia in filtrate (percent) | 0.610 | 0.47 |

As a comparison to the above results, a further sample of solution obtained by the reaction of alumina with fluosilicic acid was stirred in the presence of $AlF_3 \cdot 3H_2O$ crystals for 4½ hours at 90 to 95° C. A slurry was obtained and this slurry was filtered to remove the solid aluminum fluoride. Analysis of the aluminum fluoride showed a phosphorus content of 540 p.p.m. Analysis of the filtrate showed an aluminum content of 0.7%. It will be seen therefore that precipitating ammonium acid cryolite in accordance with the invention will give a much purer aluminum fluoride product when the ammonium acid cryolite is converted to aluminum fluoride since the ammonium acid cryolite contains very little phosphorus impurity. Further, the ammonium acid cryolite is more easily precipitated than aluminum fluoride trihydrate. Further, the ammonium acid cryolite is obtained in higher yield, as indicated by a comparison of the quantity of aluminum remaining in the filtrates in the alternative processes.

A sample of the acid ammonium cryolite was heated to about 400° C. for 15 minutes in a slowly flowing stream of dry nitrogen. The anhydrous aluminum fluoride product was analyzed and found to have an F/Al ratio of 2.89 and to contain 59% F and 0.97% $NH_3$.

Modifications are possible within the scope of the invention.

What I claim is:

1. A method which comprises reacting in aqueous solution an aluminum-containing material with fluosilicic acid at elevated temperatures at a pH sufficiently acid to inhibit precipitation of aluminm fluoride trihydrate, said fluosilicic acid being the phosphorus contaminated by-product of the wet process of producing phosphoric acid from phosphate rock, separating precipitated silica, increasing the atomic ratio of F:Al in said solution to at least 5:1, reacting said solution with ammonia while maintaining the pH of said solution below about 5 to thereby precipitate diammonium hydrogen hexafluoroaluminate substantially free of phosphorus from said solution.

2. The method of claim 1 wherein said aluminum-containing material is alumina.

3. The method of claim 2 wherein said alumina is reacted with said fluosilicic acid at a temperature of about 90° to 95° C.

4. The method of claim 1 wherein said atomic ratio of F:Al in said solution is increased by the addition thereto of a fluorine-containing material selected from hydrogen fluoride, fluorine gas and ammonium bifluoride.

5. The method of claim 4 wherein said atomic ratio is increased to about 6:1.

6. The method of claim 1 wherein ammonia gas is bubbled through said solution while maintaining the pH of said solution below about 4.

7. A method for the production of aluminum fluoride which comprises reacting in aqueous solution an aluminum-containing material with fluosilicic acid at elevated temperature at a pH sufficiently acid to inhibit precipitation of aluminum fluoride trihydrate, said fluosilicic acid being the phosphorus contaminated by-product of the wet-process of producing phosphoric acid from phosphate rock, separating precipitated silica, increasing the atomic ratio of F:Al in said solution to at least 5:1, reacting said solution with ammonia while maintaining the pH of said solution below about 5 to precipitate thereby a diammonium hydrogen hexafluoroaluminate substantially free of phosphorus from said solution, recovering said precipitated diammonium hydrogen hexafluoroaluminate, calcining said recovered diammonium hydrogen hexafluoroaluminate to produce substantially anhydrous aluminum fluoride.

8. The method of claim 7 wherein said calcining is carried out at a temperature of from about 350° to 600° C.

9. The method of claim 8 wherein said calcining is carried out at a temperature of about 400° C.

10. The method of claim 8 including initial dehydration of said diammonium hydrogen hexafluoroaluminate at a temperature of about 100° to 150° C.

11. The method of claim 7 including recovering ammonia and hydrogen fluoride from said calcining step.

References Cited

UNITED STATES PATENTS

| 2,382,327 | 8/1945 | Miles | 23—88 |
| 3,525,584 | 8/1970 | Kidde | 23—88 |

FOREIGN PATENTS

| 269,661 | 8/1966 | Australia | 23—88 |

OTHER REFERENCES

Indo et al.: "Chemical Abstracts," vol. 65, 1966, p. 10177(b).

Bukhalova et al.: "Chemical Abstracts," vol. 65, 1966, p. 3067.

HERBERT T. CARTER, Primary Examiner

U.S. Cl. X.R.

23—88